Nov. 10, 1925.
W. R. WEBB
PROCESS OF MAKING ALKYL CHLORIDES
Filed July 18, 1924
1,560,625
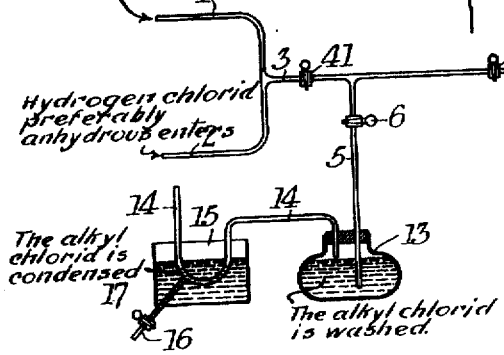
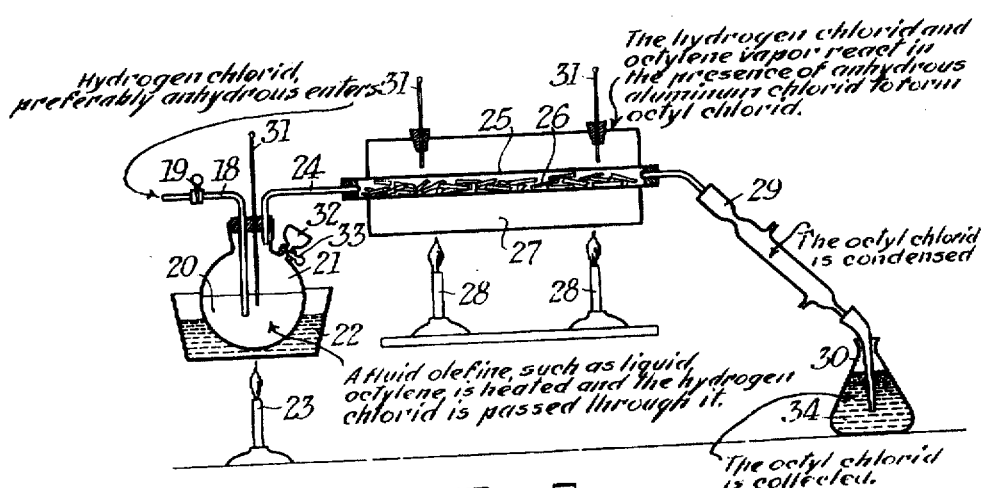
INVENTOR,
William R. Webb,
BY R. L. Stinchfield
ATTORNEY Patented Nov. 10, 1925.

1,560,625

UNITED STATES PATENT OFFICE.

WILLIAM R. WEBB, OF ROCHESTER, NEW YORK, ASSIGNOR, BY MESNE ASSIGNMENTS, TO CARBIDE & CARBON CHEMICALS CORPORATION, A CORPORATION OF NEW YORK.

PROCESS OF MAKING ALKYL CHLORIDES.

Application filed July 18, 1924. Serial No. 726,861.

*To all whom it may concern:*

Be it known that I, WILLIAM R. WEBB, a citizen of the United States of America, residing at Rochester, in the county of Monroe and State of New York, have invented certain new and useful Improvements in Processes of Making Alkyl Chlorides, of which the following is a full, clear, and exact specification.

This invention relates to a process of making alkyl chlorides. One object of the invention is to provide a new process of making one or more alkyl chlorides by uniting one or more olefins and hydrogen chloride. Other objects will hereinafter appear. This application is a continuation in part of my application Serial No. 515,647, filed Nov. 16, 1921, for process of making ethyl chloride.

In the accompanying drawing Figs. 1 and 2 are diagrammatic sectional views of examples of apparatus in which my process may be carried out.

I have found that hydrogen chloride and olefins react in the presence of aluminum chloride to form substantial amounts of alkyl chlorides. The ingredients are preferably substantially anhydrous. Moreover in the preferred forms of my invention I employ those olefins which are gaseous or can be readily changed into the gaseous or vaporous state; so that the reaction can be brought about while they are in that state. The fluid olefins (gaseous or liquid at room temperature) are especially useful. Since ethylene and octylene are typical, I shall refer to them in the following examples, but it will be understood that the other fluid members of the olefin series can be used alone or mixed, due allowance being made, of course, for their different boiling points.

Referring to Fig. 1, dry ethylene, or other gaseous olefin or a mixture of such olefins, enters by tube 1 and substantially dry hydrogen chloride enters by tube 2 into the mixing pipe 3 controlled by valves 4 and 41. From pipe 3 extends a lateral pipe 5 controlled by a valve 6. A vertical extension 7 of pipe 3 enters the reaction vessel 8, extending well toward the bottom thereof or preferably above the top of the substantially anhydrous aluminum chloride 9. Tube 10 leads from the vessel 8 to a pressure gauge 11 which is shown conventionally in the form of the usual U-tube containing mercury. The tube 10 and extension 7 may conveniently be located in a removable closure 12 for the reaction vessel 8.

First, 100 parts of anhydrous aluminum chloride are charged into the reaction vessel 8. Then a mixture of equal parts of olefin gas, say ethylene, and hydrogen chloride is admitted to the reaction vessel under slight pressure until the gauge indicates a pressure equivalent to 2" of mercury, valve 4 being next closed to shut off the supply of gases. Ordinary room temperature may be employed. An action takes place, which appears to be an absorption of the product of the reaction in the aluminum chloride, although I do not wish to be restricted to a particular theory.

As the reaction proceeds the pressure decreases and finally a vacuum is produced. When this amounts to the equivalent of 1" of mercury, the valve 4 may be cautiously opened and the mixed gases then slowly admitted until the pressure in the reaction vessel again rises to that of 2" of mercury. As the reaction proceeds, the aluminum chloride heats up slightly and finally may change its characteristic appearance to that of a thick plastic mass.

When the reaction proceeds by a series of steps until the pressure changes do not indicate a sufficient further reaction or absorption, then valve 41, which has previously been opened, is closed, valve 4 is opened and valve 6 is opened to a wash bottle 13 containing water. Tube 14 leading from the wash bottle passes into a condenser 15 containing a refrigerating mixture. The reaction vessel 8 is then heated to approximately the boiling point of water—that is, over a boiling water bath. The gases passing off from the heated aluminum chloride mass enter the extension 7 and pass along tube 3 and out the side tube 5 through the water wash bottle 13 and thence through pipe 14 to the condenser 15. With the condenser at approximately 0° C., the alkyl chloride (ethyl chloride where ethylene is used) will condense therein. It may be removed from the condenser through any suitable exit 16, controlled by valve 17.

Where the olefin to be treated is a liquid at room temperature it is desirable to gasify or vaporize it and effect the reaction while it is in such state. Referring to Fig. 2, I shall describe the production of octyl chloride, because this is typical of the liquid olefins, but it will be understood that the other liquid olefins or mixtures can be likewise treated in a similar manner.

Dry hydrochloric acid gas enters into tube 18 controlled by stop cock 19, the tube 18 passing into container 21 below the level of the octylene 20 in the bottom thereof. The container 21 is heated by any suitable means to facilitate the vaporizing of the octylene. Thus, by way of illustration, I have shown an oil bath 22 heated by a burner 23. While the temperature of the octylene may be kept at its boiling point, it is preferable to keep it somewhat below that point in order to control the process better, say 5° C., below the boiling point. The steady stream of substantially anhydrous hydrochloric acid gas bubbles through the heated octylene and is thoroughly mixed with the vapors of the octylene in the upper part of container 21.

The mixed gases then pass through pipe 24, to the reaction chamber 25, in which is located the catalytic material. This is preferably anhydrous aluminum chloride. Any of the known expedients for giving a large surface to catalysts may be used, such as forming or subliming the aluminum chloride on to fragments of any inert material, such as quartz, glass, and the like. The reaction chamber 25 is kept at a temperature sufficient to prevent substantial condensation of the octylene, as such. In other words, it may be kept roughly 25° C., above the boiling point of the olefin. The reaction temperature will thus be about 150° C., in the case of octylene. The reaction chamber 25 is sufficiently long to effect a substantial reaction, having in view the contact area of the catalyst 26. By way of illustration, I have shown the heating means for the reaction chamber or tube 25 to comprise a surrounding air bath 27 heated by burners 28.

The reaction may be conducted intermittently, say until the level of the octylene in container 21 approaches the lower end of tube 18; or it may be carried on continuously, new batches of the olefin being charged in the container 21 through tube 32 controlled by stop cock 33.

The vapors from reaction chamber 25 pass through any suitable condenser 29 into collecting vessel 30. Preferably the latter contains a suitable separating fluid, such as water, 34. Since it is preferable to pass the gases through the reaction chamber 25 at a velocity which does not admit of complete conversion of the olefin, the unchanged olefin, such as octylene, floats on top of the water. The octyl chloride which is formed also floats on the water, together with any polymerized hydrocarbons which may be formed by intermolecular combination of the olefins themselves. Any uncombined hydrochloric acid tends to dissolve in the water.

By decanting off the oily layer of olefin, alkyl chloride, and polymerized hydrocarbons and then washing them with water a substantially complete removal of any residual hydrochloric acid can be effected. The washed oily mixture is then separated into its constituents by any preferred purification method, say by fractional distillation. If the latter procedure is adopted in the case of octyl chloride, fractions boiling between 150° C. and 205° C. are selected. Then these are still further separated by the usual procedure.

Less polymerization of the olefin vapors into complex hydrocarbons takes place when an excess of hydrochloric acid is present. Such an excess is, therefore, maintained in the preferred form of my invention. It is more easily effected if the temperature of the liquid olefin in vessel 21 be kept considerably below its boiling point. I have, for example, been able to carry out the reaction and lessen the polymerization of the olefin, especially in the case of octylene, by lowering the temperature of the liquid 20 even to 60° C. This materially lowers the vapor tension above the liquid; and consequently the flow of substantially anhydrous hydrochloric acid gas through pipe 18 to the upper part of vessel 21 is readily kept high enough to insure an excess of the acid.

Having thus described my invention, what I claim as new and desire to secure by Letters Patent is:

1. The process which comprises the step of reacting upon an olefin with hydrogen chloride in the presence of aluminum chloride until an alkyl chloride is produced.

2. The process which comprises the step of reacting upon a substantially anhydrous olefin with substantially anhydrous hydrogen chloride in the presence of substantially anhydrous aluminum chloride until an alkyl chloride is produced.

3. The process which comprises the step of reacting upon an olefin, which is fluid at room temperature, with hydrogen chloride under the influence of an anhydrous aluminum chlorid until an alkyl chloride is produced.

4. The process which comprises the step of reacting upon ethylene with hydrogen chloride in the presence of aluminum chloride until ethyl chloride is produced.

5. The process which comprises the step of reacting upon substantially anhydrous ethylene with substantially anhydrous hydrogen chloride in the presence of substantially anhydrous aluminum chloride until ethylene chloride is produced.

6. The process which comprises the step of reacting upon substantially anhydrous ethylene with substantially anhydrous hydrogen chloride in the presence of substantially anhydrous aluminum chloride, the pressure of said gases being diminished during such step.

7. The process which comprises the steps of repeatedly reacting on substantially anhydrous ethylene with substantially anhydrous hydrogen chloride in the presence of substantially anhydrous aluminum chloride, the pressure being raised at the start of each repetition.

8. The process which comprises the steps of reacting on ethylene with hydrogen chloride in the presence of aluminum chloride until ethyl chloride is generated on said aluminum chloride, and removing and collecting said ethyl chloride.

9. The process which comprises the steps of reacting upon substantially anhydrous ethylene with substantially anhydrous hydrogen chloride in the presence of substantially anhydrous aluminum chloride until ethyl chloride is generated on said aluminum chloride, and then removing and collecting said ethyl chloride.

10. The process which comprises the steps of bringing a mixture of substantially anhydrous ethylene and substantially anhydrous hydrogen chloride into contact with substantially anhydrous aluminum chloride until ethyl chloride is formed on said aluminum chloride, and then distilling off the said ethyl chloride and purifying and condensing the same.

Signed at Rochester, New York, this 12th day of July, 1924.

WM. R. WEBB.

ethylene with substantially anhydrous hydrogen chloride in the presence of substantially anhydrous aluminum chloride, the pressure of said gases being diminished during such step.

7. The process which comprises the steps of repeatedly reacting on substantially anhydrous ethylene with substantially anhydrous hydrogen chloride in the presence of substantially anhydrous aluminum chloride, the pressure being raised at the start of each repetition.

8. The process which comprises the steps of reacting on ethylene with hydrogen chloride in the presence of aluminum chloride until ethyl chloride is generated on said aluminum chloride, and removing and collecting said ethyl chloride.

9. The process which comprises the steps of reacting upon substantially anhydrous ethylene with substantially anhydrous hydrogen chloride in the presence of substantially anhydrous aluminum chloride until ethyl chloride is generated on said aluminum chloride, and then removing and collecting said ethyl chloride.

10. The process which comprises the steps of bringing a mixture of substantially anhydrous ethylene and substantially anhydrous hydrogen chloride into contact with substantially anhydrous aluminum chloride until ethyl chloride is formed on said aluminum chloride, and then distilling off the said ethyl chloride and purifying and condensing the same.

Signed at Rochester, New York, this 12th day of July, 1924.

WM. R. WEBB.

Certificate of Correction.

It is hereby certified that Letters Patent No. 1,560,625, granted November 10, 1925, upon the application of William R. Webb, of Rochester, New York, for an improvement in "Processes of Making Alkyl Chlorides," were erroneously issued to "Carbide & Carbon Chemicals Corporation, a Corporation of New York," whereas said Letters Patent should have been issued by direct and mesne assignments of *one-half to Eastman Kodak Company, of Rochester, N. Y., a Corporation of New York,* and *one-half to Carbide & Carbon Chemicals Corporation, a Corporation of New York,* as shown by the records of assignments in this office; and that the said Letters Patent should be read with this correction therein that the same may conform to the record of the case in the Patent Office.

Signed and sealed this 15th day of December, A. D. 1925.

[SEAL.]
WM. A. KINNAN,
*Acting Commissioner of Patents.*

Certificate of Correction.

It is hereby certified that Letters Patent No. 1,560,625, granted November 10, 1925, upon the application of William R. Webb, of Rochester, New York, for an improvement in "Processes of Making Alkyl Chlorides," were erroneously issued to "Carbide & Carbon Chemicals Corporation, a Corporation of New York," whereas said Letters Patent should have been issued by direct and mesne assignments of *one-half to Eastman Kodak Company, of Rochester, N. Y., a Corporation of New York*, and *one-half to Carbide & Carbon Chemicals Corporation, a Corporation of New York*, as shown by the records of assignments in this office; and that the said Letters Patent should be read with this correction therein that the same may conform to the record of the case in the Patent Office.

Signed and sealed this 15th day of December, A. D. 1925.

[SEAL.]

WM. A. KINNAN,
*Acting Commissioner of Patents.*